(No Model.)
C. H. HERSEY.
DRIER.
No. 263,518. Patented Aug. 29, 1882.
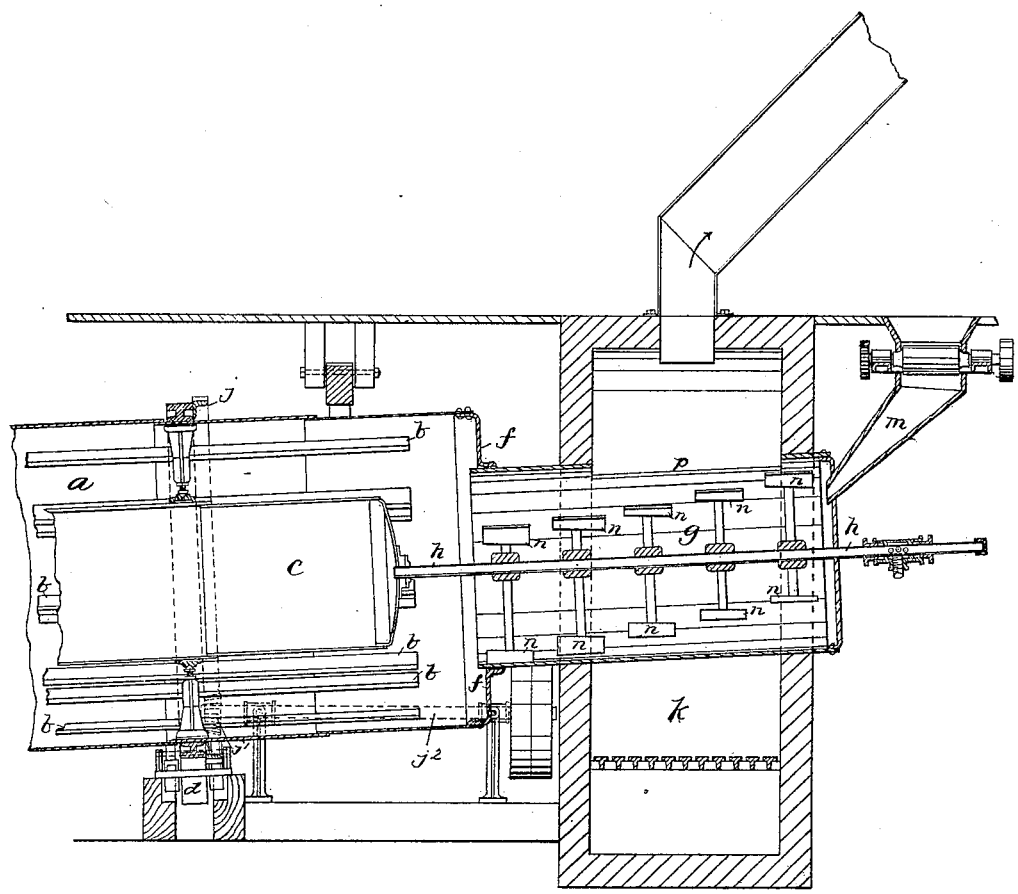
Witnesses.
Bernice J. Noyes.
John F. C. Prentiss
Inventor.
Charles H. Hersey
By Crosby & Gregory attys.

UNITED STATES PATENT OFFICE.

CHARLES H. HERSEY, OF BOSTON, MASSACHUSETTS, ASSIGNOR OF ONE-HALF TO FRANCIS C. HERSEY, OF SAME PLACE.

DRIER.

SPECIFICATION forming part of Letters Patent No. 263,518, dated August 29, 1882.

Application filed July 12, 1882. (No model.)

*To all whom it may concern:*

Be it known that I, CHARLES H. HERSEY, of Boston, county of Suffolk, State of Massachusetts, have invented an Improvement in Driers, of which the following description, in connection with the accompanying drawing, is a specification.

My invention relates to driers, and has for its object to produce a drier for economically treating material containing a large amount of moisture.

In another application for Letters Patent I have shown a drying apparatus consisting of a drier operated by steam heat, substantially such as shown in Letters Patent granted to me April 25, 1871, in combination with a primary chamber through which the material to be dried is passed on its way to the said drier operated by steam heat. In the said application the primary chamber was formed as a portion of the drum of the steam-heated drier, and rotated therewith to agitate the material passing through it, the said chamber being located in a furnace, and consequently exposed to far greater heat than that derived from the steam in the other portion of the drum, so that the wet material, in passing through the said primary chamber, has the greater part of its moisture removed before entering the portion of the drier heated by steam, in which the operation of drying is completed without danger of burning the said material.

The present invention consists mainly in making the primary or furnace-heated chamber stationary and independent of the drum of the steam-drying portion of the apparatus, and in providing agitating arms or stirrers in the said drum to agitate the material being dried.

The drawing shows in longitudinal section a drying apparatus embodying this invention.

The portion of the drier that is operated by steam heat may be of any suitable or usual construction, it being shown as substantially the same as in Letters Patent granted to me, hereinbefore referred to.

The drum $a$, provided with blades or buckets $b$, and containing a heating-cylinder, $c$, is mounted on rollers $d$ in a slightly-inclined position, its lower end being open and its higher end being provided with a flange, $f$, encircling the end of the primary or furnace-heated chamber $g$, which opens directly into the drum $a$.

The heating-cylinder $c$ is provided with the usual inlet and outlet steam-pipes, the former, $h$, rotating with the said cylinder and drum, which are actuated by the gear $j$ and pinion $j'$ on the shaft $j^2$, as described in the before-mentioned patent.

The chamber $g$ is mounted in a furnace, $k$, and is provided with a chute or inlet-passage, $m$, for the introduction of the material to be dried.

A series of agitating arms or stirrers, $n$, are mounted to rotate in the chamber $g$, to agitate the material passing through the said chamber, they being shown in this instance as mounted on the steam-pipe $h$ and rotating therewith. The chamber $g$ is opened at its upper side into the furnace, as shown at $p$, to thus permit the escape of the steam and moisture that is expelled from the material passing through it and the drum $a$, a current of air being caused to flow through the latter toward the said chamber by the difference in temperature or other means.

It is obvious that the invention is not limited to any particular kind of steam drying apparatus. If desired, the outer drum, $a$, may be stationary, it being made as a steam-jacket, and the material agitated therein by arms or stirrers similar to those employed in the chamber $g$.

I claim—

1. The combination, with the steam drying apparatus, of the primary chamber stationary in a furnace, and agitating arms or stirrers movable in the said chamber, substantially as described.

2. The steam drying apparatus consisting of a drum and heating-cylinder therein, having inlet and outlet steam-pipes, combined with the furnace-heated primary chamber and agitating arms or stirrers therein, and means to rotate the said drum-cylinder and stirrers, substantially as described.

In testimony whereof I have signed my name to this specification in the presence of two subscribing witnesses.

CHAS. H. HERSEY.

Witnesses:
GEO. W. GREGORY,
JOS. P. LIVERMORE.